Sept. 28, 1965 A. STENERT ETAL 3,208,804
COMPOSITE BEARING AND METHOD OF MAKING THE SAME
Filed Dec. 3, 1962

INVENTORS
Alois Stenert
Heinz Tschälsch
Georg Nadorff by Michael S. Striker
Atty United States Patent Office 3,208,804
Patented Sept. 28, 1965

3,208,804
COMPOSITE BEARING AND METHOD OF
MAKING THE SAME
Alois Stenert and Heinz Tschätsch, Lippstadt, and Georg Nadorff, Dortmund-Horde, Germany, assignors to Eisenwerk Rothe Erde G.m.b.H., Dortmund, Germany
Filed Dec. 3, 1962, Ser. No. 241,932
Claims priority, application Germany, Dec. 1, 1961,
E 22,049
6 Claims. (Cl. 308—15)

The present invention relates to composite bearings and the method of making the same. More specifically, the present invention relates to composite anti-friction bearings which comprise a bearing race and a housing member surrounding and supporting the race or to composite bearings in which a gear ring surrounds and is fixedly attached to an annular bearing member.

Bearings of this type are manufactured in all sizes from very small diameters to very large diameters and such bearings are used in great many different applications where they are subjected to bearing pressures varying greatly in magnitude.

To satisfy all operating conditions under which such bearings are used, the elements of these bearings for instance the housing member and the race ring inserted therein, or the bearing member and the gear ring surrounding the same may be made from a great variety of different materials. In such composite bearings the elements from which the bearings are formed have been joined to each other according to the prior art by screw connections or preferably, when the members to be joined are both made from metal, by shrink-fitting these members to each other so as to fixedly join the members. Such shrink-fitting of the members of a composite bearing to each other is however connected with various disadvantages. The bearing race of such a composite bearing member is liable to wear to a greater extent than the housing member surrounding and supporting the bearing race and after extended use it is often desired to replace the bearing race in the housing member. If these two members are shrink-fitted to each other, the disassembly of the same is rather difficult since it requires a heating of the housing member or an undercooling of the race to loosen the shrink fit. During this operation, especially when the housing member is heated, the latter will quite often be warped so that it cannot be used any longer. An additional disadvantage of connecting the two members of a composite bearing by shrink-fitting is that the two members to be fixedly joined by shrink-fitting have to be manufactured to very close tolerances.

The present invention aims to overcome the disadvantages of composite bearings according to the prior art and especially the disadvantages of composite bearings in which bearing members are shrink-fitted to each other.

It is a further object of the present invention to provide for a composite bearing including two annular members one inserted into the other and fixedly joined to each other in which the members can be manufactured with wider tolerance than is necessary in a bearing arrangement in which the members are shrink-fitted to each other.

It is an additional object of the present invention to provide for a composite bearing of the mentioned type in which the fixed connection between the two coaxial bearing members can be easily removed without distorting any of the members when replacement of one of the members is desired.

With the above objects in view, the method of making a composite bearing including a first annular member and a second annular member coaxial with and fixed to the first annular member mainly comprises according to the present invention the steps of manufacturing said annular members with tolerances permitting free insertion of one annular member into the other annular member, and fixedly joining said annular members to each other by means of an adhesive. The composite bearing itself according to the present invention mainly comprises a first annular member coaxially inserted with a small clearance in the first annular member and adhesive means between the two means for fixedly joining the same to each other. Preferably at least one of the annular members is made from metal or the annular members may be made from different metals. The clearance between the two members and therefore the layer of adhesive between the two members is preferably held to a thickness of less than 0.4 mm. In a preferred form of the composite bearing of the present invention sealing means are also provided in the clearance between the two annular members to prevent penetration of a corrosive medium into the clearance between the two members and attack of the adhesive layer by such medium.

Composite anti-friction bearing are known in which metal bands or wire rings which are preferably made from steel are provided in grooves of a housing member to form annular contacting surfaces for the rollers or balls of the anti-friction bearing. In bearings of this type according to the prior art it is the usual practice to place these bands or wire rings loosely into grooves of the housing member. Such bearings have however the disadvantage that the bands or wire rings tend to shift in the groove and thereby deterimentally affect the quality of the bearing. The present invention also overcomes this disadvantage of bearings of the aforementioned type in that in bearings according to the present invention the metal bands or metal wires are fixedly joined to the housing member by an adhesive. The wires or bands can therefore not shift any longer within the groove and the quality as well as the useful life of the bearing is thereby greatly increased.

An additional advantage of the present invention is that bearing members formed from different metals can be easily and fixedly joined by the method according to the present invention. Thus, for instance, the support ring of the bearing may be made from light metal alloys such as aluminum alloys in which bearing races of steel are inserted which are joined by an adhesive layer to the supporting ring. The supporting ring may also be made from low quality steel or a casting into which a race ring of high quality alloy steel is inserted and joined by a layer of adhesive material to the bearing ring.

Any of the well known adhesive materials such as, for instance, epoxy resins may be used for fixedly joining the members of the composite bearings to each other. The thus fixedly joined members may be disconnected from each other by heating the assembly to approximately 100–120° C., whereby no warping of the members will result.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 3:
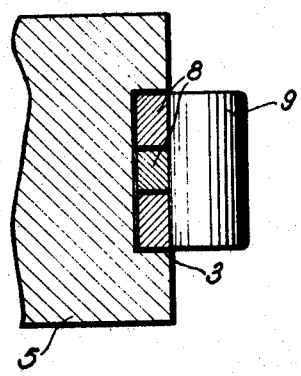
Figure 4:
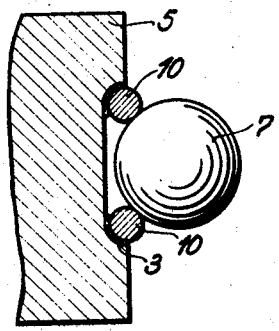

FIG. 3 is a partial cross section through another embodiment of a composite anti-friction member according to the present invention and showing a housing member and race ring means composed of a plurality of steel bands; and FIG. 4 is a partial cross section through an additional embodiment of a composite anti-friction bearing according to the present invention and partially showing a housing member and race ring means formed by a pair of annular wire rings.

Figure 1:
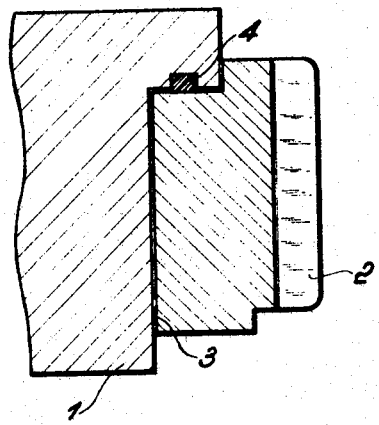
FIG. 1 is a partial cross section through a composite bearing of the present invention and partially showing an annular bearing member and a gear ring surrounding the annular bearing member fixedly joined thereto.

Referring now to the drawings, and more specifically to FIG. 1 which shows a composite bearing according to the present invention, it will be seen that this bearing includes an annular housing member 1 only partially shown in FIG. 1 which is surrounded by a gear ring 2. The housing member 1 and the gear ring 2 are manufactured in such a manner that the gear ring 2 can be easily slipped over the outer cylindrical surface of the bearing member 1 while a small clearance in the order of 0.4 mm. or less will remain between the two members. The two members are fixedly joined to each other by a layer of adhesive 3 located in and filling the clearance between the two members. Preferably, one of the members and as shown in the drawing, the bearing member 1 is formed in a surface portion thereof facing the surface portion of the gear ring with an annular groove in which appropriate sealing means 4 are located and this groove and the sealing means for the ring is preferably formed in the region of an outer end of the clearance of the two members so as to prevent penetration of corrosive media into the main portion of the adhesive layer between the two members. A similar groove and sealing means therein may also be provided adjacent to the other end of the adhesive layer.

Figure 2:
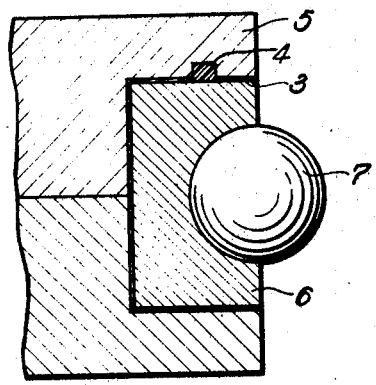
FIG. 2 is a partial cross section through another embodiment according to the present invention and showing a composite anti-friction bearing including a housing member and a race ring fixedly joined thereto.

FIG. 2 shows in partial cross section a composite anti-friction bearing according to the present invention which comprises a housing member 5, shown in FIG. 2 as a two-part member which is formed at an inner cylindrical surface thereof with an annular groove in which a race ring 6 is located with small clearance between the housing member 5 and the race ring. The clearance preferably made to the same dimension as mentioned above is filled with an adhesive layer 3 which fixedly joins the members 5 and 6 to each other. The inner cylindrical surface of the race ring 6 is formed with a semi-spherical annular groove in which the balls 7, one of which is shown in FIG. 2, are located and guided in the usual manner.

FIG. 3 shows an additional embodiment of an anti-friction bearing according to the present invention and this embodiment includes a housing member 5 formed in an inner cylindrical surface thereof with an annular groove of substantially rectangular cross section. Located side by side in this groove and substantially filling the same are a plurality of steel bands 8. The steel bands are joined to each other and to the groove surface of the bearing member 5 by layers of adhesive material 3 which fixedly join the bands 8 to each other and to the housing member 5. FIG. 3 shows also one of the rolls 9 in engagement with the steel bands 8 and it is understood that a plurality of such rolls 9 are provided which may engage directly a shaft to be supported in the bearing or which may engage a corresponding inner bearing member not shown in the drawing.

FIG. 4 shows an additional embodiment of a composite bearing according to the present invention and this bearing includes a housing member 5 formed at an inner cylindrical surface thereof with a groove in which a pair of wire rings 10 are located spaced from each other closely adjacent to the curved side faces of the groove. The wire rings are again fixedly joined to the portions of the groove surface adjacent thereto by layers 3 of adhesive. FIG. 4 also shows one of a plurality of balls 7 engaging the wire rings and it is understood that the bearing shown in FIG. 4 as well as the bearing shown in FIG. 2 includes also an inner race ring engaging the other side of the rolls 7. The inner race rings not shown in the drawing may be formed in a similar manner as composite race rings in which the elements forming the composite inner race rings are made from metal and joined to each other by adhesive layers.

In all the embodiments shown, at least one of the elements which are joined by adhesive to the other element are preferably made from metal or both of the elements may be made from metal of different composition or different quality.

It will be understood that each of the elements described above, or two or more together, may also find a useful application in other types of composite bearings differing from the types described above.

While the invention has been illustrated and described as embodied in composite anti-friction bearing in which at least one of the elements is made from metal, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended, to be comprehended within the meaning and range of equivalence of the following claims.

What is claimed as new and desired to be secured by Letters Patent is:

1. In a composite bearing, in combination, a first annular member; a second annular member coaxially inserted with a small clearance in said first annular member, said members being made of metal; adhesive means between said two members fixedly joining the same to each other; and sealing means sealing said clearance against intrusion of destructive media into said adhesive means.

2. In a composite bearing, in combination, a first annular support member; a second annular race member coaxially inserted with a clearance in the order of 0.4 mm. in said first annular member, said first and said second annular members being made of different metals; a layer of adhesive in said clearance between said annular members fixedly joining the same to each other; and sealing means extending across said clearance for preventing the intrusion of destructive media into said layer of adhesive.

3. In a composite anti-friction bearing, in combination, a housing member having an inner cylindrical surface and having in said inner cylindrical surface an annular groove; a plurality of annular steel bands located side by side in said groove and substantially filling the same, said annular steel bands having inner faces forming a composite cylindrical bearing surface; and adhesive means between said bands, and between said bands and the surface of the groove fixedly joining said bands to each other and to said housing member.

4. In combination, an annular bearing member; a gear ring member surrounding said annular bearing member with a small clearance, at least one of said members being made from metal; a layer of adhesive between said members and fixedly joining the same to each other; and sealing means sealing said clearance against intrusion of destructive media into said layer of adhesive.

5. In combination, a first annular member; a second annular member coaxially inserted with small clearance in said first annular member; a layer of adhesive between said members fixedly joining the same to each other; and sealing means located in said clearance for preventing corrosive media to penetrate into said layer of adhesive.

6. In a composite anti-friction bearing, in combination, a support ring; a race ring coaxially inserted with a small clearance in said support ring, said race ring being made of metal; a layer of an adhesive between said rings fixedly joining the same to each other; and a sealing means located in said clearance for preventing corrosive media to penetrate into said layer of adhesive.

References Cited by the Examiner

UNITED STATES PATENTS

| | | | |
|---|---|---|---|
| 1,489,013 | 4/24 | Schatz | 308—195 |
| 2,220,027 | 10/40 | Scott | 308—239 X |
| 2,399,847 | 5/46 | Bauersfeld | 308—216 |
| 2,686,091 | 8/54 | Young | 156—294 X |
| 2,745,778 | 5/56 | Garten | 156—294 X |
| 2,919,956 | 1/60 | Ormsby | 308—238 X |
| 2,976,741 | 3/61 | Martin | 29—159.2 X |
| 3,011,013 | 11/61 | Sandkvist | 156—294 X |
| 3,023,059 | 2/62 | Kirk | 308—238 |
| 3,056,636 | 10/62 | Mims | 308—196 |

DON A. WAITE, *Primary Examiner.*

FRANK SUSKO, *Examiner.*